Sept. 4, 1956  F. LAHMAN  2,761,577
STACK MOVER TRAILER
Filed Oct. 7, 1954  3 Sheets-Sheet 1

INVENTOR.
Fritz Lahman
BY
Merchant & Merchant
ATTORNEYS

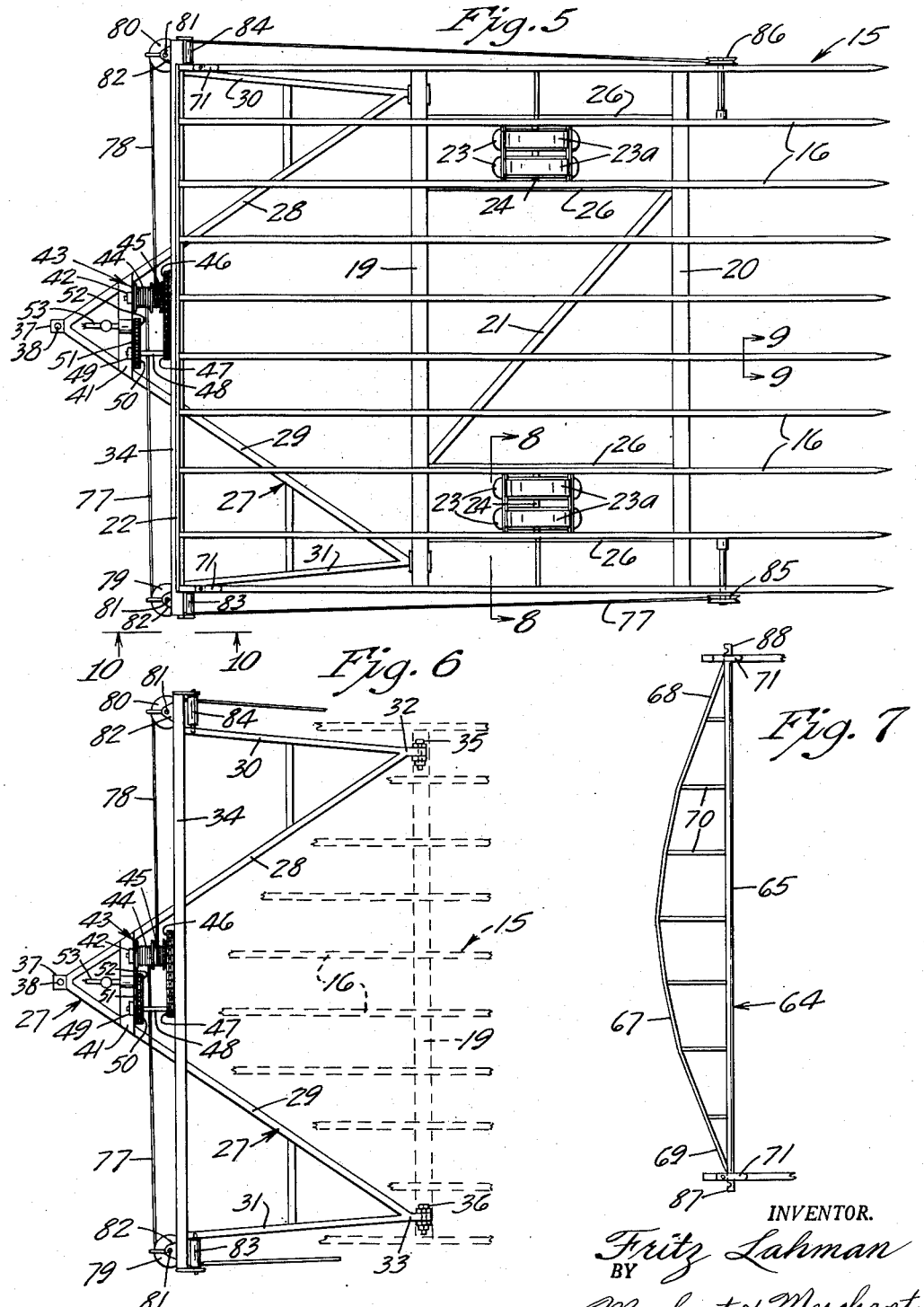

Sept. 4, 1956  F. LAHMAN  2,761,577
STACK MOVER TRAILER
Filed Oct. 7, 1954  3 Sheets-Sheet 3
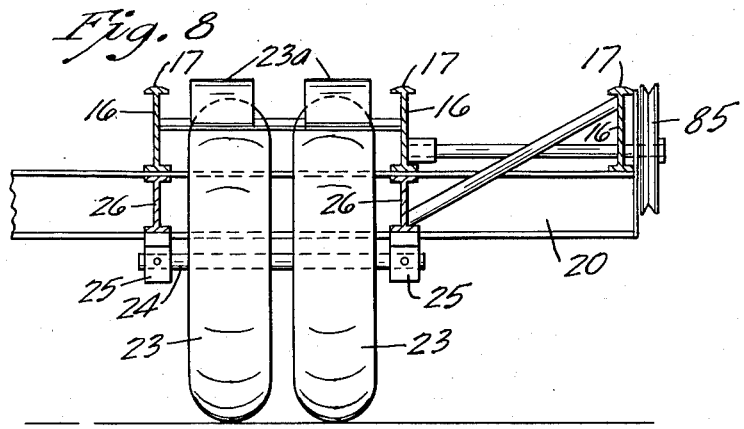
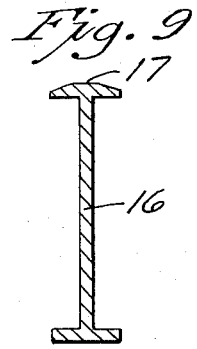
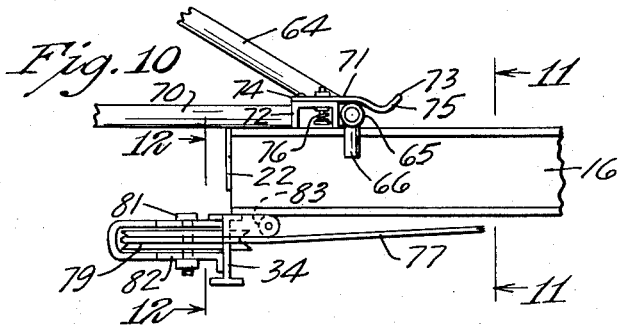
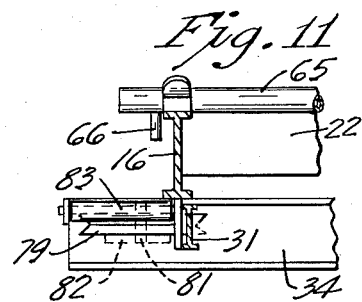
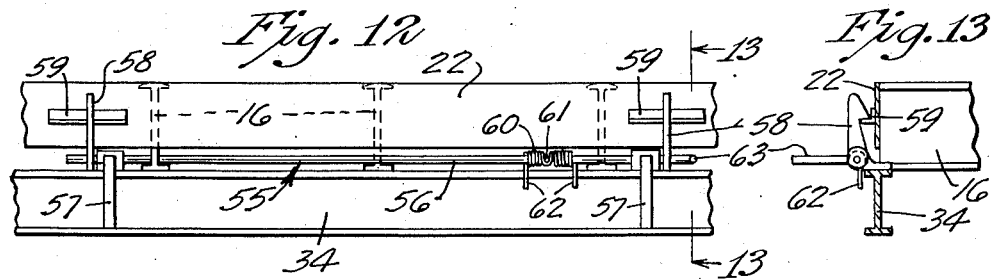
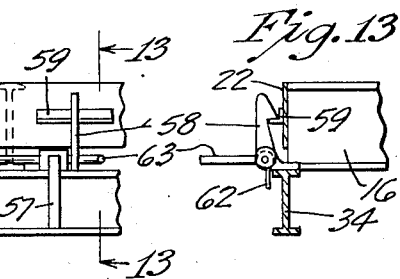
INVENTOR.
Fritz Lahman
BY
Merchant & Merchant
ATTORNEYS United States Patent Office 2,761,577
Patented Sept. 4, 1956

2,761,577

STACK MOVER TRAILER

Fritz Lahman, Hecla, S. Dak.

Application October 7, 1954, Serial No. 460,883

8 Claims. (Cl. 214—506)

My invention provides a novel and improved structure for the moving of haystacks and the like.

This application is a continuation-in-part of my copending application, Serial No. 384,107, filed October 5, 1953, and now abandoned.

The primary object of my invention is the provision of an improved device which can be backed up to a haystack or the like and which is provided with mechanically driven cable means which, when placed about the stack, may be utilized to draw the entire stack upwardly onto a tilted rack; this rack will then be raised to assume a horizontal position for transporting the stack to any desired position or destination; and thereafter, means are provided for utilizing the mechanically driven cable means to remove the stack from the rack at the desired destination.

Another object of my invention is the provision of a device of the class described which may be detachably secured to a tractor and which may derive a power source from said tractor.

A further object of my invention is the provision of a device of the class described which is relatively inexpensive to produce, which is easy to operate, which is rugged in construction and is extremely durable.

The above and still further objects of my invention will become apparent from the following detailed specification, appended claims and attached drawings.

Referring to the drawings, wherein like characters indicate like parts throughout the several views:

Fig. 5 is a view in top plan on the same scale as Fig. 3 with my rack clearer removed;

Fig. 6 is a view in top plan of the forward half of the structure shown in Fig. 5 with some parts being removed and others partially shown in dotted lines;

Fig. 7 is a view in top plan of my rack clearer on the same scale as Fig. 3 and showing broken away the lateral limits of the stack mover rack;

Fig. 8 is an enlarged fragmentary view partly in section and partly in front elevation as seen on line 8—8 of Fig. 5;

Fig. 9 is an enlarged view in cross section as seen on line 9—9 of Fig. 5;

Fig. 10 is an enlarged fragmentary view in side elevation as seen on line 10—10 of Fig. 5;

Fig. 11 is a fragmentary view partly in section and partly in rear elevation as seen on line 11—11 of Fig. 10;

Fig. 12 is an enlarged central fragmentary view in front elevation taken substantially along line 12—12 of Fig. 10 showing the latching means retaining the stack mover rack in the stack-carrying position of Fig. 2; and Fig. 13 is a fragmentary view partly in section and partly in side elevation as seen on line 13—13 of Fig. 12.

Figure 1:
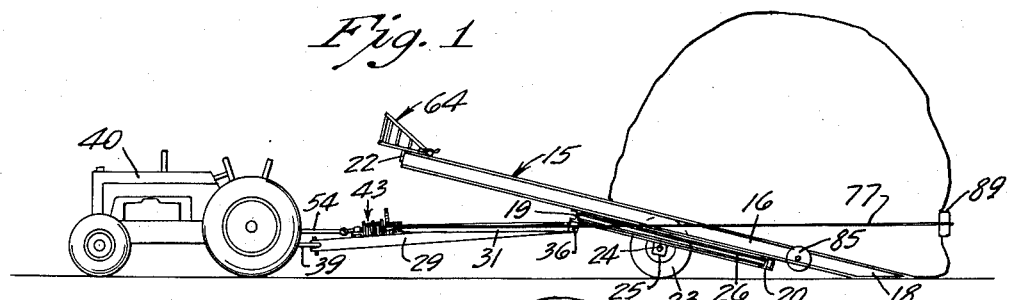
Fig. 1 is a view in side elevation of my stack mover showing the same in a stack-loading position.
Figure 2:
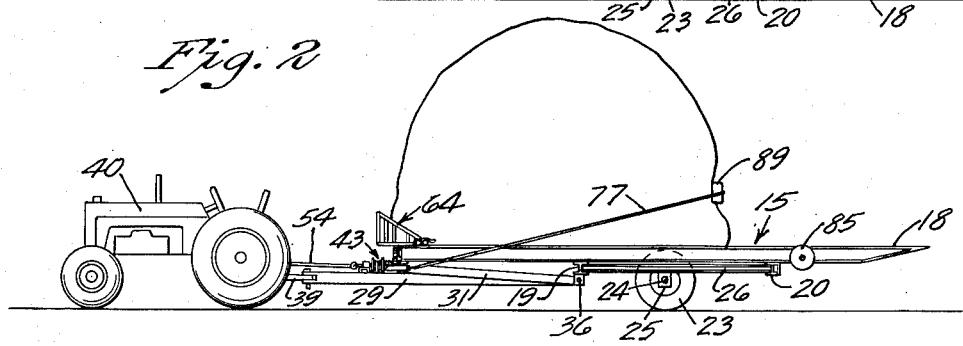
Fig. 2 is a view corresponding to Fig. 1 but showing my stack mover in a stack-carrying position.
Figure 3:
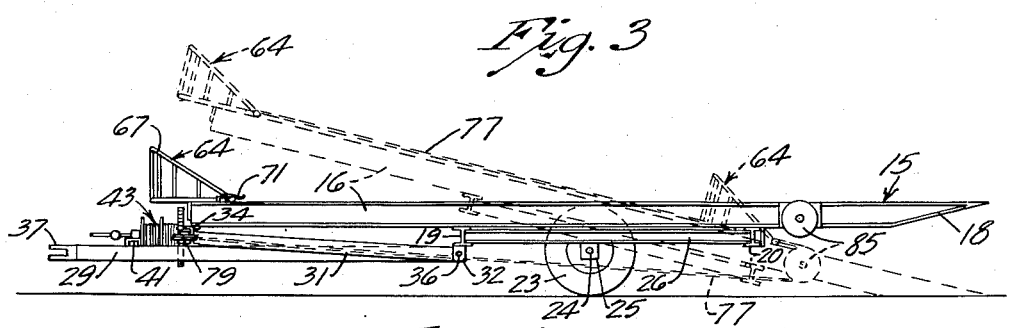
Fig. 3 is an enlarged view in side elevation, the load-discharging position being indicated by dotted lines and showing the rack clearer in two positions.
Figure 4:
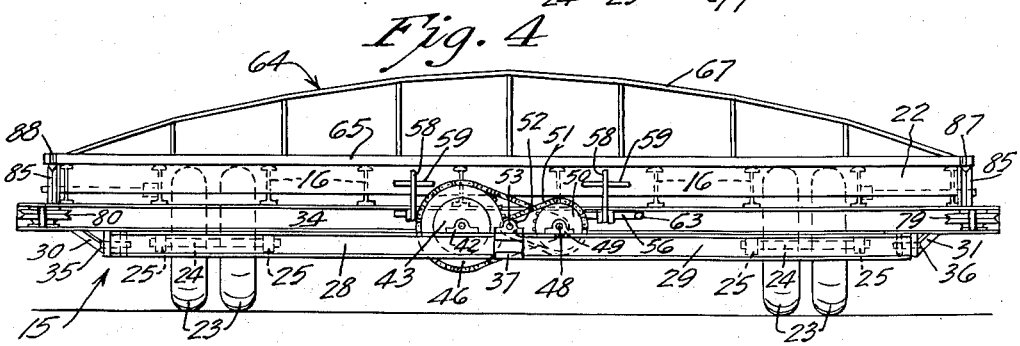
Fig. 4 is a view in front elevation of the structure shown in Fig. 3 on an enlarged scale.

Referring more particularly to the drawings, reference numeral 15 indicates, in its entirety, a rack made up of a plurality of longitudinally extended, laterally spaced, parallel beams 16, preferably I-beams having tapered top flanges 17, as shown in Fig. 9, and tapered rear ends 18 as shown in Figs. 1–3; cross beams 19 and 20 underlying and extending at right angles to the parallel beams 16; a transverse support 21 extending between cross beams 19 and 20; and a front plate 22. Wheels 23, preferably in pairs as shown, are provided to mount the rack 15 for movement and are surrounded on their top sides by shields 23a. The wheels 23 are mounted on axles 24 journalled in depending bearing supports 25 secured to beams 26 extending at right angles between cross beams 19 and 20. Depending bearing supports 25 provide means mounting the rack 15 on axle 24 and wheels 23 for pivotal rocking movement on an axis parallel to the axis of the wheels 23. This permits the pivoting of rack 15 from the horizontal load-carrying position of Fig. 2 to the rearwardly inclined load-pickup and discharge position of Fig. 1, as is clearly shown in full and dotted lines in Fig. 3.

Referring to Fig. 6, I provide a drawbar, indicated in its entirety by the numeral 27, comprising a pair of forwardly converging members 28 and 29 joining with forwardly and slightly upwardly extending support members 30 and 31, a transverse member 34 which overlies the forwardly converging members 28 and 29 and is secured to the ends of members 30 and 31 opposite their juncture with members 28 and 29. Adjacent the juncture of members 28 and 30 and members 29 and 31 are rear ends 32 and 33, respectively, of the drawbar 27. Rear ends 32 and 33 are journalled on stub shafts 35 and 36, mounted on cross beam 19, to pivotally mount the drawbar 27 to the under portion of the rack 15 forwardly of its axis of pivotal movement. Means consisting of a slotted member 37 having a vertically extending aperture 38 is mounted at the apex of forwardly converging members 28 and 29 to detachably secure the drawbar 27 to a drawbar 39 of a conventional tractor 40, see Figs. 1 and 2. A mounting plate 41 is secured to said converging members 28 and 29 forwardly of said transverse member 34. Journalled in a bearing support 42 secured to the mounting plate 41 is a conventional winch 43 having winding drums 44 and 45 and a sprocket wheel 46. Winch 43 is driven by a chain extending from sprocket wheel 46 around a small diameter sprocket wheel 47 secured to a shaft 48 which at its opposite end 49 is journalled for rotation on mounting plate 41. Adjacent end 49 is a sprocket wheel 50 connected by chain 51 with a sprocket wheel 52 carried by a shaft 53 mounted for rotation on plate 41 and adapted to be operatively connected to the power takeoff shaft 54 of the tractor 40.

Referring in particular to Fig. 12, transverse member 34 of the drawbar 27 is adapted to underlie the front end of rack 15 at right angles to the parallel beams 16 when rack 15 is in the load-carrying position. Latching means, indicated in its entirety by the reference numeral 55, extends between the transverse member 34 and the front end of rack 15 to retain the rack 15 in its load-carrying position until released. Latching means 55 comprises a shaft 56 journalled for rotation by spaced bearing brackets 57 which are secured to the transverse member 34. Secured to the shaft 56 for movement therewith are latching elements 58, see Fig. 13, adapted to engage forwardly extending brackets 59 secured to front plate 22 of rack 15. Elements 58 are biased into engagement with brackets 59 by a torsion spring 60 coiled around the shaft 56, having its intermediate portion engaged on a stop pin 61 thereon and having its free ends 62 in engagement with the top flange of transverse member 34. One end of the shaft 56 is formed as a handle 63 for disengaging elements 58 from the brackets 59.

A rack clearer, designated in its entirety by the numeral 64, is mounted on the upper surface of rack 15 for sliding movements from a normal position overlying the front end, as shown in full lines in Fig. 5, to a position rearwardly of the wheels 23 as shown in dotted lines in Fig. 3. Rack clearer 64 comprises a rod 65 overlying said rack and extending at right angles to parallel beams 16 beyond the lateral limits of the rack 15. Depending bosses 66 are carried by rod 65 adjacent its outer ends and are positioned outside the lateral limits of the rack 15 and engage the outer edges of the outer beams 16 to prevent lateral shifting of the rack clearer 64 and to guide it for longitudinal sliding movements on the rack 15. An arcuate-shaped frame structure 67 is secured at its ends 68 and 69 to the rod 65 and also secured by braces 70 extending horizontally therebetween. The frame structure 67 curves forwardly from the rod 65 and extends vertically upwardly from the horizontal plane of the rack 15. Frame structure 67 is adapted to embrace a haystack or the like to effectively discharge it from the rack 15 at any desired position. An important feature of my rack clearer 64 is the fact that it extends transversely across the entire width of the rack 15 so that it can easily and effectively clear the entire rack 15 of all material that it might be carrying by a single rearward movement thereof.

A resilient latching means 71, see Fig. 10, is secured to the outermost beams 16 on each side of the rack 15 adjacent front palte 22 and is adapted to engage the rod 65 to yieldingly maintain the rack clearer 64 in its normal position overlying the front end of the rack 15. Resilient latching means 71 comprises a U-shaped support 72 and a resilient latching member 73 fixed thereto at its end 74. Latching member 73 opposite end 74 is formed with a downwardly recurved end 75, and intermediate ends 74 and 75 is secured to support 72 for limited upward pivotal movement about its end 74 against the bias of a spring 76.

Cable means 77 and 78 are associated with winding drums 44 and 45, respectively, of the winch 43 to move a haystack or the like onto the rack 15 and also to move the rack clearer 64 from its normal position to its rearward position beyond the pivotal mounting of the rack 15. Horizontally positioned sheaves 79 and 80 are carried at opposite ends of the transverse member 34, beyond the lateral limits of rack 15 and approximately coplanar with the axis of rotation of the winch 43, on pins 81 secured to brackets 82. Sheaves 79 and 80 and rollers 83 and 84, positioned behind the sheaves 79 and 80, are adapted to direct and guide the cable means 77 and 78, respectively. Vertically extending sheaves 85 and 86 are positioned rearwardly of the cross beam 20 and extend beyond the lateral limits of the rack 15. Sheaves 85 and 86 comprise means for guiding the cable means 77 and 78 in a direction to selectively cause rearward rack clearing movements to be imparted to the rack clearer 64. It is important that the sheaves 79, 80, 85 and 86 are all positioned beyond the lateral limits of the rack 15 so that the cable means 77 and 78 will not become fouled and may always be visible and accessible to the operator.

The extreme ends of rod 65 are formed as hooks 87 and 88 projecting laterally outwardly to provide means for detachably securing cable means 77 and 78 to the rack clearer 64.

When it is desired to move a haystack or the like with my novel stack mover, it is connected to a conventional tractor 40 by securing drawbar 27 to drawbar 39 and by connecting shaft 53 to the power takeoff shaft 54 of the tractor 40. My stack mover is then moved by the tractor 40 adjacent the haystack to be moved. Latching means 55 is released through the handle 63 which disengages elements 58 from the brackets 59. Rearward movement of the tractor 40 in the direction of the haystack to be moved will cause a rearward tilting movement of the rack 15 until the tapered ends 18 of the parallel beams 16 come into engagement with the ground. This is the rearwardly inclined load-pickup position of the stack mover. Thereafter, sufficient amounts of the cable means 77 and 78 are unreeled from the winch 43 to cause the free ends thereof to be joined at the rear end of the haystack. The cable means 77 and 78 are directed and guided by sheaves 79 and 80 and rollers 83 and 84 and each encompass an opposite side of the haystack and form a loop thereabout. Preferably, a relatively wide beam 89 is placed between the looped cable means 77 and 78 and the haystack to increase the pulling surface exerted by the cables. Finally, when rotary winding movements are imparted to the winch 43 through shafts 48 and 53 and power takeoff shaft 54, the cable means 77 and 78 will be wound about their respective winding drums 44 and 45 and my stack mover will be relatively moved under the haystack as shown in Fig. 1 and the haystack will then be moved from the position of Fig. 1 to the position of Fig. 2. The tapered top flanges 17 of the parallel beams 16, as clearly shown in Fig. 9, facilitate the loading of the haystack by decreasing the frictional surface of the rack 15. As the rack 15 is caused, under the weight of the haystack, to assume its normal load-carrying position shown in Fig. 2, the latching elements 58 of latching means 55 will automatically overlie the brackets 59 to maintain the loaded rack 15 in its load-carrying position.

When it is desired to unload the haystack from the rack 15, cable means 77 and 78 are caused to pass over sheaves 85 and 86, respectively, and the free ends thereof are secured to hooks 87 and 88, respectively; and latching means 55 is released. Winding movements of the winch 43 will cause rod 65 of the rack clearer 64 to move rearwardly from under the yielding bias of end 75 of latching member 73; and the rack clearer will be moved rearwardly to assume the rearward dotted line position of Fig. 3. The rearward movement of the haystack will cause rack 15 to tilt to the load-discharge position of Fig. 3 and a sufficient portion of the haystack will come into engagement with the ground so as to enable the tractor 40 to pull the tilted rack 15 free of the haystack.

My invention has been sufficiently tested and found to be entirely satisfactory. It will be obvious to those skilled in the art that my invention may be modified by many substitutions and equivalents and that this disclosure is intended to be illustrative only. Therefore, I intend to be limited solely by the scope of the appended claims.

What I claim is:

1. In a device of the class described, a wheel mounted rack having front and rear end portions, said rack comprising a plurality of longitudinally extended laterally spaced parallel beams having tapered rear ends and beveled top flanges, wheels mounting said rack, pivotal mounting means intermediate said end portions mounting said rack for pivotal rocking movements about a substantially horizontal axis from a substantially horizontal load-carrying position to a rearwardly downwardly tilted load-pickup and discharge position, a transversely extended rack clearer projecting above the plane of said rack and mounted thereon for sliding movements from a normal position overlying the front end thereof to a position rearwardly of said pivotal mounting means, a drawbar acting frame pivotally secured at one end thereof to the under portion of said rack forward of said pivotal mounting means and extending forwardly therefrom beyond the front end portion of the rack, securing means on the other end of said frame adapted to detachably secure same to a prime mover locking means between the forward end of said rack and an intermediate portion of said frame for retaining said rack in its load-carrying position, a winch mounted on said frame intermediate the ends thereof, cable means carried by said winch extending outwardly and rearwardly of the rack and adapted to encircle the base portion of a load and pull same onto said rack under action of said winch when said rack is in its rearwardly downwardly tilted position, said winch being disposed on said frame below the front end portion of said rack during the rearwardly downwardly tilted position whereby said cable means will extend substantially horizontally to engage the base portion of a load to be pulled on said rack, means for detachably securing said cable means to said clearer, and means guiding said cable means in a direction to selectively cause rearward rack-clearing movements to be imparted to said clearer.

2. In a device of the class described, a wheel mounted rack having front and rear end portions, pivotal mounting means intermediate said end portions mounting said rack for pivotal rocking movements about a substantially horizontal axis from a substantially horizontal load-carrying position to a rearwardly downwardly tilted load-pickup and discharge position, a transversely extended rack clearer projecting above the plane of said rack and mounted thereon for sliding movements from a normal position overlying the front end thereof to a position rearwardly of said pivotal mounting means, a drawbar acting frame pivotally secured at one end thereof to the under portion of said rack forwardly of said pivotal mounting means and extending forwardly therefrom beyond the forward end portion of said rack, securing means on the other end of said frame adapted to detachably secure same to a prime mover, an intermediate portion of said frame consisting of a transverse member having opposite ends projecting laterally outwardly beyond the opposite sides of said rack, locking means between the forward end of said rack and said transverse member for retaining said rack in its load-carrying position until released, a winch mounted on said frame intermediate the ends thereof, cable means carried by said winch, sheaves carried by the opposite ends of said transverse member for guiding said cable means, said cable means extending outwardly and rearwardly of the rack and adapted to encircle the base portion of a load and pull the same onto said rack under action of said winch when said rack is in its rearwardly downwardly tilted position, said winch being disposed on said frame below the front end portion of said rack during the rearwardly downwardly tilted position whereby said cable means will extend substantially horizontally to engage the base portion of a load to be pulled on said rack, means for detachably securing said cable means to said clearer, and means guiding said cable means in a direction to selectively cause rearward rack-clearing movements to be imparted to said clearer.

3. The structure defined in claim 1 wherein said drawbar acting frame comprises a pair of forwardly converging members pivotally secured at their rear ends to the under portion of said rack forwardly of said pivotal mounting means therefor, and a transverse member supported by said converging members underlying the front end of said rack when said rack is in the load-carrying position and extending at right angles to said parallel beams laterally outwardly beyond the opposite sides of said rack, and in further combination with sheaves carried by the opposite ends of said transverse member for guiding said cable means.

4. The structure defined in claim 1 wherein said rack clearer comprises a rod having a length at least as great as said rack overlying said rack at right angles to said parallel beams, depending bosses carried by said rod adjacent the outer ends thereof and beyond the lateral limits of said rack, and an arcuate shaped frame structure secured to said rod and curving forwardly from the ends thereof, said arcuate shaped frame structure extending vertically upwardly from the horizontal plane of said rack; and wherein said means for detachably securing said cable means to said clearer comprise hooks projecting laterally outwardly from the ends of said rod.

5. In a device of the class described, a rack; wheels mounting said rack; means mounting said rack on said wheels intermediate the front and rear ends of said rack for pivotal rocking movements on an axis parallel to the axis of said wheels from a horizontal load-carrying position to a rearwardly tilted load-pickup and discharge position; a drawbar comprising a pair of forwardly converging members pivotally secured at their rear ends to the under portion of said rack forwardly of said pivotal mounting means therefor, means on the forward end of said drawbar adjacent the juncture of said converging members for detachably securing said drawbar to a tractor, and a transverse member overlying said converging members and carried thereby and underlying the front end of said rack when said rack is in the load-carrying position, said transverse member extending at right angles to said parallel beams laterally outwardly beyond the opposite sides of said rack; latch means between said transverse member and the forward end of said rack biased into latching relationship for retaining said rack in its load-carrying position until released; a mounting plate secured to said converging members forwardly of said transverse member; a winch journalled on said mounting plate for rotation; cable means associated with said winch; horizontally positioned sheaves carried by the opposite ends of said transverse member beyond the lateral limits of said rack substantially coplanar with the axis of rotation of said winch for guiding said cable means; a transversely extended rack clearer projecting above the plane of said rack and mounted thereon for sliding movements from a normal position overlying the front end thereof to a position rearwardly of said pivotal mounting means comprising a rod having a length at least as great as said rack overlying said rack at right angles to said parallel beams, depending bosses carried by said rod adjacent the outer ends thereof and beyond the lateral limits of said rack, and an arcuate-shaped frame structure secured to said rod and curving forwardly from the ends thereof, said frame structure extending vertically upwardly from the horizontal plane of said rack; a resilient latching means yieldingly maintaining said rack clearer in its normal position; hooks projecting laterally outwardly from the ends of said rod for detachably securing said cable means to said clearer; and vertically extending sheaves positioned on opposite sides of said rack and projecting laterally outwardly beyond the limits thereof rearwardly of the axis of pivotal movement of said rack, said last-mentioned sheaves positioned for guiding said cable means in a direction to selectively cause rearward rack clearing movements to be imparted to said clearer when said cable means is secured to the hooks of said clearer; whereby said cable means are adapted to operably engage a stack and pull the same onto said rack under action of said winch when said rack is in its rearwardly tilted position and to operably engage said rack clearer to move the same under action of said winch from its normal position rearwardly to remove the stack from the rack.

6. In a device of the class described, a wheel mounted rack having front and rear end portions, pivotal mounting means intermediate said end portions mounting the rack for pivotal rocking movements about a substantially horizontal axis from a substantially horizontal load-carrying position to a rearwardly downwardly tilted load pick-up and discharge position, a drawbar acting frame pivotally secured at one end thereof to the under portion of the rack forward of said pivotal mounting means and extending forwardly therefrom beyond the front end portion of the rack, securing means on the other end of said frame adapted to detachably secure same to a prime mover, a winch mounted on said frame intermediate the ends thereof, cable means carried by said winch extending outwardly and rearwardly of the rack and adapted to encircle the base portion of a load and pull same on to said rack under action of the winch when said rack is in the rearwardly downwardly tilted position, said winch being disposed on said frame below the front end portion of said rack during the rearwardly downwardly tilted position whereby said cable means will extend substantially horizontally to engage the base portion of a load to be pulled on said rack, a rack clearer on the rack adapted to be operably secured to said cable means to remove a load from the rack, and locking means forward of said pivotal mounting means retaining said rack in said load carrying position during the transportation of a load.

7. The structure defined in claim 6, wherein said drawbar acting frame includes a transverse member having the opposite ends projecting laterally outwardly beyond opposite sides of the rack, and sheave means carried by the opposite ends of said member guiding said cable means toward the rear end portion of the rack.

8. The structure defined in claim 7, wherein said rack clearer extends transversely of the rack a distance at least as great as the width of the rack and projects above the plane thereof, means slidably mounting said clearer on said rack for movements thereon between a normal position overlying the front end portion thereof to a rack cleared position rearwardly of said pivotal mounting, and guide means for said cable means selectively directing said rack clearer in the rearward rack cleared position, said guide means comprising sheave means on opposite sides of said rack disposed below the plane thereof and rearwardly of said pivotal mounting means, and securing means for releasably securing said cable means to said clearer comprising hooks projecting outwardly from opposite ends of said clearer.

References Cited in the file of this patent

UNITED STATES PATENTS

| | | |
|---|---|---|
| 1,941,400 | Johnson | Dec. 26, 1933 |
| 2,121,153 | Konicek | June 21, 1938 |
| 2,316,702 | McDaniel | Apr. 13, 1943 |
| 2,411,183 | Baldwin | Nov. 19, 1946 |

FOREIGN PATENTS

| | | |
|---|---|---|
| 189,969 | Great Britain | Dec. 14, 1922 |
| 585,726 | Great Britain | Feb. 21, 1947 |